United States Patent
Yu et al.

(10) Patent No.: US 10,462,711 B2
(45) Date of Patent: Oct. 29, 2019

(54) CONTROLLING TCP DATA TRANSMISSION

(71) Applicant: Futurewei Technologies, Inc., Plano, TX (US)

(72) Inventors: Jing Yu, San Diego, CA (US); Julia Wang, San Diego, CA (US); Yumin Tang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/426,319

(22) Filed: Feb. 7, 2017

(65) Prior Publication Data
US 2018/0220337 A1    Aug. 2, 2018

Related U.S. Application Data

(60) Provisional application No. 62/451,909, filed on Jan. 30, 2017.

(51) Int. Cl.
*H04W 36/00* (2009.01)
*H04L 5/00* (2006.01)
(Continued)

(52) U.S. Cl.
CPC ....... *H04W 36/0022* (2013.01); *H04L 5/0055* (2013.01); *H04L 47/34* (2013.01);
(Continued)

(58) Field of Classification Search
CPC . H04L 47/193; H04L 47/115; H04W 28/0236
See application file for complete search history.

(56) References Cited

U.S. PATENT DOCUMENTS 7,330,902 B1 *  2/2008  Bergenwall ............ H04L 29/06
                                                      370/465
7,882,207 B1 *  2/2011  Titmuss ................ H04W 8/082
                                                      709/217
(Continued)

FOREIGN PATENT DOCUMENTS

WO       2013159516 A1    10/2013

OTHER PUBLICATIONS

D. Borman et al., "TCP Extensions for High Performance," RFC 7323, Internet Engineering Task Force (IETF), total 50 pages, Sep. 2014.

*Primary Examiner* — Asad M Nawaz
*Assistant Examiner* — Syed Ali
(74) *Attorney, Agent, or Firm* — Fish & Richardson P.C.

(57) ABSTRACT

The disclosure includes a method for rapidly recovering the speed of TCP transmission after a cross technology handover experienced by a mobile device. In the method, the mobile device receives a sequentially first TCP data packet after the cross technology handover completes via a TCP session between the mobile device and a remote TCP server, generates a first acknowledgement (ACK) associated with the sequentially first TCP data packet, where the first ACK comprises a first Selective ACK (SACK) option, removes the first SACK option from the first ACK when a gap exists between data in the sequentially first TCP data packet and data received before the cross technology handover occurs, and sends the first ACK without the first SACK option to the remote TCP server via the TCP session. Because the ACK is without the SACK option when the gap exists, the speed of TCP transmission will be recovered rapidly.

17 Claims, 10 Drawing Sheets

(51) Int. Cl.
*H04L 12/801* (2013.01)
*H04W 28/02* (2009.01)
*H04W 36/14* (2009.01)

(52) U.S. Cl.
CPC ... *H04W 28/0226* (2013.01); *H04W 28/0273* (2013.01); *H04W 36/14* (2013.01)

(56) References Cited

U.S. PATENT DOCUMENTS

| | | |
|---|---|---|
| 9,295,085 B2 | 3/2016 | Lee et al. |
| 2005/0132077 A1 | 6/2005 | Biran et al. |
| 2005/0141455 A1 | 6/2005 | Kim et al. |
| 2008/0310368 A1* | 12/2008 | Fischer ............ H04L 47/10 370/331 |
| 2009/0196173 A1* | 8/2009 | Wang ............ H04W 72/0486 370/230 |
| 2009/0245201 A1* | 10/2009 | Motegi ............ H04L 49/90 370/331 |
| 2010/0041364 A1* | 2/2010 | Lott ............ G06Q 30/016 455/404.1 |
| 2010/0291931 A1* | 11/2010 | Suemitsu ............ H04W 36/245 455/436 |
| 2012/0226802 A1* | 9/2012 | Wu ............ H04L 1/1825 709/224 |
| 2013/0191706 A1* | 7/2013 | Zopf ............ H04L 1/0014 714/776 |
| 2015/0039763 A1* | 2/2015 | Chaudhary ............ H04L 47/125 709/226 |
| 2015/0201349 A1* | 7/2015 | Lee ............ H04W 28/0236 370/236 |
| 2016/0373944 A1* | 12/2016 | Jain ............ H04L 43/50 |
| 2018/0376393 A1* | 12/2018 | Wu ............ H03M 13/2966 |

* cited by examiner

CONTROLLING TCP DATA TRANSMISSION

PRIORITY

This application claims priority to U.S. Provisional Appl. No. 62/451,909, filed on Jan. 30, 2017, which is incorporated by reference herein.

BACKGROUND

Transmission Control Protocol (TCP) is one of the main Internet protocols of Internet protocol suite. TCP originates in the initial network implementation in which TCP complements the Internet Protocol (IP). Therefore, the entire suite is commonly referred to as TCP/IP. TCP provides reliable, ordered, and error-checked delivery of a stream of octets between applications running on hosts communicating by an IP network. Major Internet applications, such as the World Wide Web, email, remote administration, and file transfer, rely on TCP. Applications that do not require reliable data stream service may use the User Datagram Protocol (UDP), which provides a connectionless datagram service that emphasizes reduced latency over reliability. With the development of the mobile telecommunication, TCP is applied on data transmission between a mobile device, such as a smart phone, and a fix device, such as a data center, and also applied on data transmission between two mobile devices. However, when a mobile device receiving data based on TCP hands over its communication, such as an ongoing call or a data session, from one wireless communication technology to another wireless communication technology, the data transmission based on TCP sometimes will reduce to a low speed for some time.

SUMMARY

In one embodiment, the disclosure includes a method, in which a mobile device detects a cross technology handover associated with the mobile device, receives a sequentially first TCP data packet after the cross technology handover completes via a TCP session between the mobile device and a remote TCP server, generates a first acknowledgement (ACK) associated with the sequentially first TCP data packet, where the first ACK comprises a first Selective ACK (SACK) option, removes the first SACK option from the first ACK when a gap exists between data in the sequentially first TCP data packet and data received before the cross technology handover occurs, and sends the first ACK without the first SACK option to the remote TCP server via the TCP session. Because no SACK option is in the ACK packet when the gap exists, the remote TCP server will not enter a "slow speed period." Therefore, the TCP data transmission based on the TCP session will recover to its full speed faster than a recovery including the "slow speed period."

In one embodiment, the disclosure includes a mobile device including a non-transitory memory comprising instructions; and one or more processors in communications with the memory. The one or more processors are configured to execute the instructions to detect a cross technology handover associated with the mobile device, receive a sequentially first TCP data packet after the cross technology handover completes via a TCP session between the mobile device and a remote TCP server, generate a first acknowledgement (ACK) associated with the sequentially first TCP data packet, where the first ACK comprises a first Selective ACK (SACK) option, remove the first SACK option from the first ACK when a gap exists between the data in the sequentially first TCP data packet and the data received before the cross technology handover occurs, and send the first ACK without the first SACK option to the remote TCP server via the TCP session. Because no SACK option is in the ACK packet when the gap exists, the remote TCP server will not enter a "slow speed period." Therefore, the TCP data transmission based on the TCP session will recover to its full speed faster than a recovery including the "slow speed period."

In one embodiment, the disclosure includes a computer program product. The product includes a computer readable storage medium and computer readable instructions, stored on the computer readable storage medium. The computer readable instructions are used for detecting a cross technology handover associated with a mobile device, for receiving, at the mobile device, a sequentially first TCP data packet after the cross technology handover completes via a TCP session between the mobile device and a remote TCP server, for generating, at the mobile device, a first acknowledgement (ACK) associated with the sequentially first TCP data packet, wherein the first ACK comprises a first Selective ACK (SACK) option, for removing the first SACK option from the first ACK when a gap exists between data in the sequentially first TCP data packet and data received before the cross technology handover occurs, and for sending the first ACK without the first SACK option from the mobile device to the remote TCP server via the TCP session. Because no SACK option is in the ACK packet when the gap exists, the remote TCP server will not enter a "slow speed period." Therefore, the TCP data transmission based on the TCP session will recover to its full speed faster than a recovery including the "slow speed period."

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
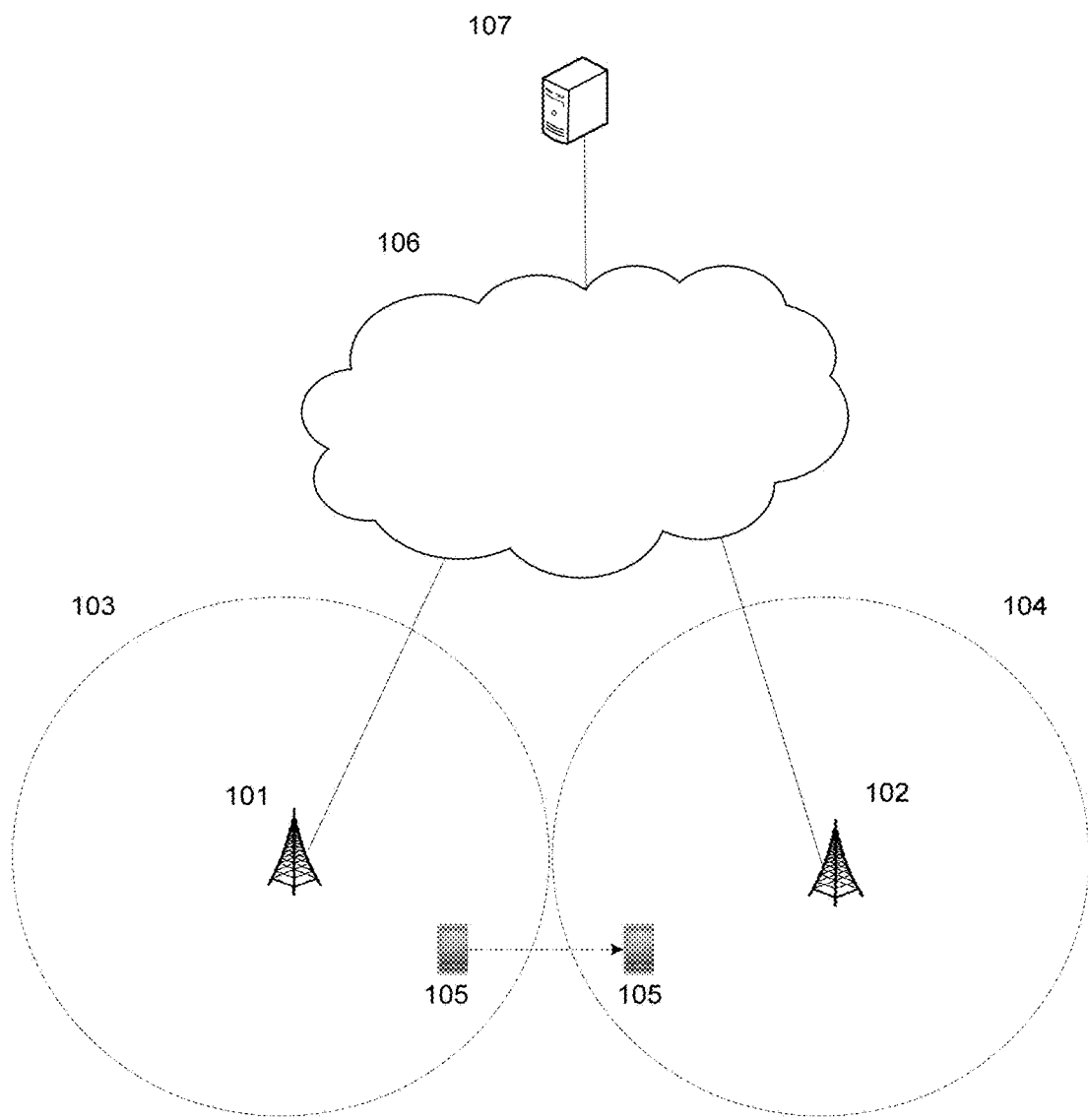
FIG. 1 illustrates a schematic diagram of a system 100 according to an embodiment of the disclosure.

FIG. 1 illustrates a schematic diagram of a system 100 according to an embodiment of the disclosure. System 100 includes base station 101 and base station 102. Each base station provides wireless communication service for an area. For example, base station 101 provides wireless communication service for area 103 and base station 102 provides wireless communication service for area 104. In some embodiments, area 103 and area 104 may represent wireless cells. In some embodiments, mobile device 105 may be a smart phone, a tablet, a laptop or a vehicle equipped with wireless communication unit. Furthermore, system 100 may include a network 106 through which each of base stations 101 and 102 may communicate with TCP server 107. TCP server 107 may be a network server, a personal computer, a laptop computer, a tablet computer or a smart phone. In some embodiments, a Transmission Control Protocol (TCP) session may be established between mobile device 105 and TCP server 107. In some embodiments, TCP server 107 refers to a remote TCP server which sends TCP data packets to mobile device 105.

In some embodiments, the communication technology, e.g. Technology 1, used by base station 101 for area 103 and the communication technology, e.g. Technology 2, used by base station 102 for area 104 are different types of technologies.

In some embodiments, Technology 1 is one technology of the technology family including Long Term Evolution (LTE), Evolution-Data Optimized (EVDO) and Code Division Multiple Access 1x, (CDMA 1x). Technology 2 is one technology of the technology family but different from Technology 1. For example, when Technology 1 is LTE, Technology 2 shouldn't be LTE, but could be EVDO or CDMA 1x.

In some embodiments, Technology 1 is one technology of the technology family including LTE, Wide Band Code Division Multiple Access (WCDMA) and General Packet Radio Service (GPRS). Technology 2 is one technology of the technology family but different from Technology 1. For example, when Technology 1 is WCDMA, Technology 2 shouldn't be WCDMA, but could be LTE or GPRS.

In such scenarios, when mobile device 105, which is receiving data via a TCP connection, moves from area 103 to area 104 or from area 104 to area 103, the data link associated with the TCP connection will experience a cross technology handover. In some embodiments, because mobile device 105 crosses cells, i.e. moving from one cell to another cell, such a cross technology handover may be referred to as cross cell handover.

In addition to the above cross cell handover, another scenario of cross technology handover is associated with the Circuit Switched Fall Back (CSFB). The situation is like this: when an LTE capable mobile device is making wireless data transmission using LTE. The mobile device, such as mobile device 105, or the network, such as network 106, may only support LTE data, however, not support Voice over LTE (VoLTE). During the TCP data transmission, if the mobile device receives, or makes, a voice call, the device will fall back from the "data only" LTE to an available "data and voice" technology, such as Universal Mobile Telecommunications System (UMTS) or CDMA 1x. Due to the fallback, the data link of the TCP connection associated with the device will experience a cross technology handover without moving to another cell. After the voice call, the device may return to the LTE data and make another vice versa cross technology handover.

In some embodiments, the TCP session between the TCP server in mobile device 105 and TCP server 107 may support Acknowledgement (ACK) packets with Selective ACK (SACK) options. In some embodiments, a processor in mobile device 105 may read computer-readable instructions and data stored in the memory of mobile device 105 to implement the TCP server in mobile device 105. The instruction and data may include a TCP stack, which is used by the processor for sending and receiving TCP data packets and ACK packets (ACKs). During the negotiation of establishing the TCP session, when the TCP server in mobile device 105 and TCP server 107 detect that both the TCP servers support ACK packets with SACK options, mobile device 105 and TCP server 107 may determine that the TCP session between mobile device 105 and TCP server 107 supports ACK packets with SACK options. In some embodiments, an ACK packet with an SACK option refers to an ACK packet with SACK option data. In some embodiments, the SACK option data may refer to valid data stored in SACK option, such as a valid value of the left edge of a block (data block) and a valid value of the right edge of the block (data block) in Request For Comments (RFC) 2018. When any one of the TCP server in mobile device 105 and TCP server 107 sends an ACK packet with an SACK option to the other of the TCP server in mobile device 105 and TCP server 107, the other may recognize that the ACK packet has an SACK option and may correctly read out the content in the SACK option.

Figure 2:
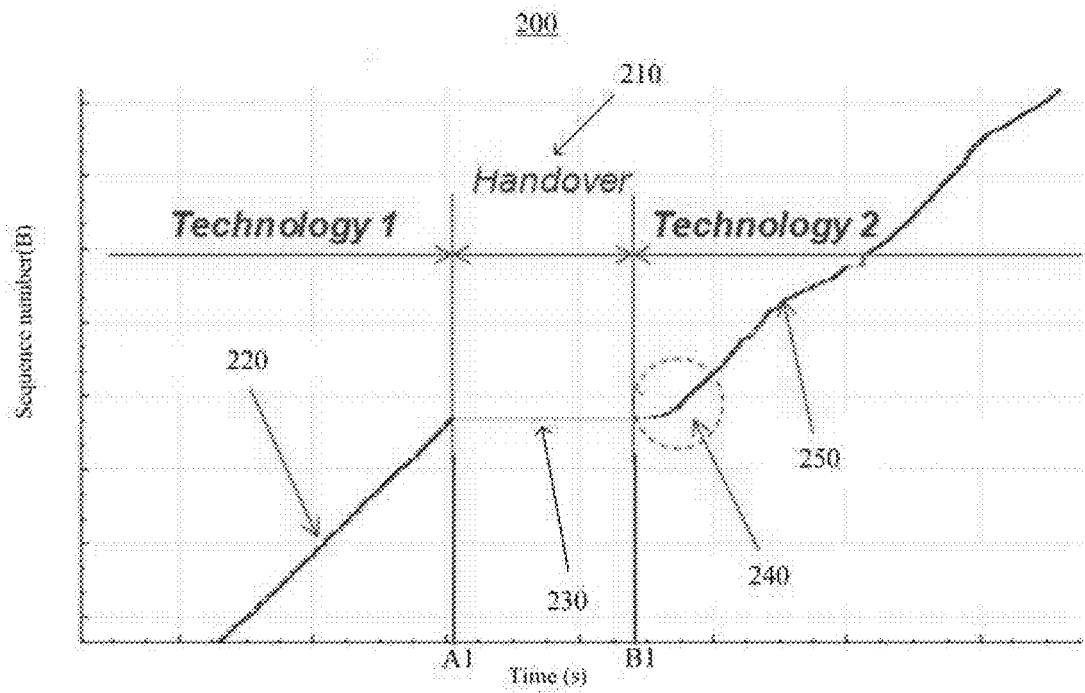
FIG. 2 illustrates a diagram 200 according to an example of the disclosure.

FIG. 2 illustrates a diagram 200 according to an example of the disclosure. Diagram 200 may illustrate the expected reception of TCP segments (TCP data packets) associated with a cross technology handover experienced by a mobile device. The TCP segments may refer to TCP data packets. The TCP data packets are data packets based on TCP. The transmission of TCP segments is based on a TCP session. A mobile device, such as mobile device 105 in FIG. 1 may hand over its communication, such as an ongoing call or a data session, from one communication technology to another communication technology. As illustrated in FIG. 2, the cross technology handover 210 starts at time instant A1 (second) and ends at time instant B1 (second).

According to the expected reception of TCP segments illustrated in FIG. 2, TCP segments are received at a stable speed before a cross technology handover. As illustrated in FIG. 2, received TCP data 220 increases steadily. The reason of the steady increase may be that TCP segments are received by the mobile device at a stable speed before cross technology handover 210. Received TCP data 220 in FIG. 2 may refer to data received by the mobile device before cross technology handover 210 via the TCP session between the mobile device, such as mobile device 105 in FIG. 1, and a remote TCP server, such as TCP server 107 in FIG. 1. The remote TCP server may send TCP data packets to the mobile device. Before cross technology handover 210, the mobile device uses Technology 1; after cross technology handover 210, the mobile device uses Technology 2. In some embodiments, Technology 1 is one technology of the technology family including LTE, Wide Band Code Division Multiple Access (WCDMA) and General Packet Radio Service (GPRS). Technology 2 is one technology of the technology family but different from Technology 1. For example, when Technology 1 is WCDMA, Technology 2 shouldn't be WCDMA, but could be LTE or GPRS.

During the cross technology handover 210, due to data loss occurs at the wireless radio link layer, the TCP data packets (TCP segments) and the Acknowledgement (ACK) packets associated with the TCP data packets will be lost or will stop to be sent. Received TCP data 230 in FIG. 2 may refer to data sent by remote TCP server and received by the mobile device during cross technology handover 210. As illustrated in FIG. 2, received TCP data 230 has no increase during cross technology handover 210, because the TCP data packets from the remote TCP server, such as TCP server 107 in FIG. 1, are lost or are not sent out so that no data is received by the mobile device. Retransmit Timeout (RTO) associated with the TCP data transmission between the mobile device, such as mobile 105 in FIG. 1, and the remote TCP server, such as TCP server 107 in FIG. 1, will occur at the remote TCP server during the handover experienced by the mobile device. Due to the RTO, the remote TCP server, such as TCP server 107 in FIG. 1 may reduce TCP congestion window associated with TCP data transmission to a minimum.

When the cross technology handover 210 is finished, the remote TCP server, such as TCP server 107 in FIG. 1, will resume the TCP data transmission from the remote TCP server to the TCP server in the mobile device, such as mobile device 105. The data transmission may be the retransmission from the point at which the last ACK packet that was received before the cross technology handover, such as handover 210 in FIG. 2. The mobile device will send the ACK packets (ACKs) associated with the TCP data packets (TCP segments) the mobile device receives.

When the sequentially first ACK packet received by the remote TCP server, such as TCP server 107, is a normal ACK packet, i.e. an ACK packet without an SACK option, the remote TCP server, such as TCP server 107, will start the "slow-start" process according to RFC 1323. In the "slow-start" process, the remote TCP server will increase the congestion window associated with the TCP data transmission exponentially so that the TCP data transmission from remote TCP server to the mobile device will recover to the full speed quickly. Received TCP data 240 in FIG. 2 illustrates the data received by the mobile device from the remote TCP server during the "slow-start" process.

After the "slow-start" process, TCP segments should be received at a stable speed again. For example, TCP data 250 in FIG. 2 refers to data received by the mobile device after the "slow-start" process via the TCP session between the mobile device, such as device 105 in FIG. 1, and the remote TCP server, such as TCP server 107 in FIG. 1. As illustrated in FIG. 2, received TCP data 250 increases steadily. The reason of the steady increase is that TCP segments are received by the mobile device at a stable speed.

Figure 3:
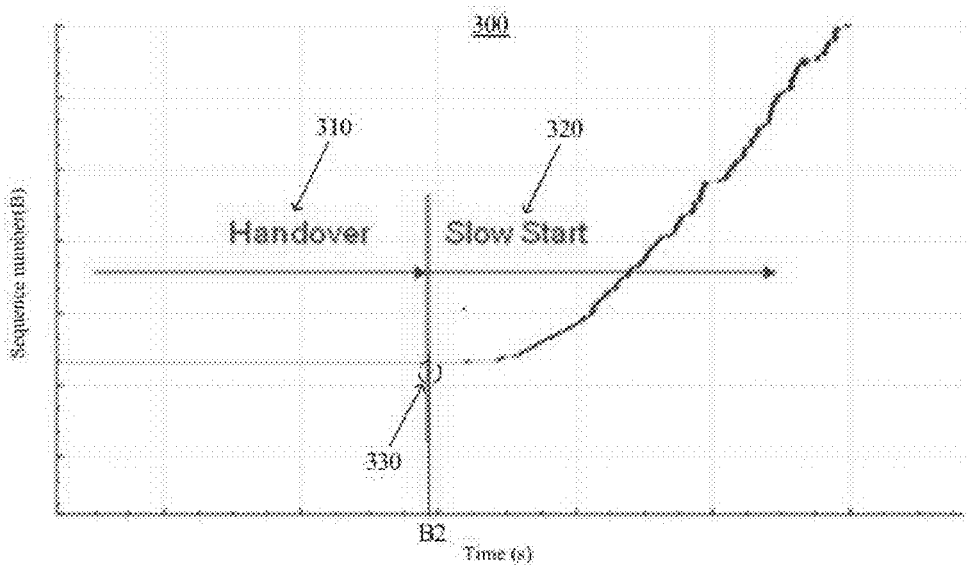
FIG. 3 illustrates a diagram 300 according to an example of the disclosure.

FIG. 3 illustrates a diagram 300 according to an example of the disclosure. Diagram 300 illustrates an expected reception of TCP segments associated with a cross technology handover of a mobile device.

As illustrated in FIG. 3, the highest sequence number of sequentially first TCP data packet 330 received by the mobile device, such as mobile device 105, after cross technology handover 310 is lower than or contingent to the continuous cumulative sequence number of the last TCP data packet received by the remote TCP server before the handover. Therefore, no gap exists between sequentially first TCP data packet 330 and last TCP data packet received by the remote TCP server before the handover. Consequently, the remote TCP server will start "slow-start" process 320, rather than a "slow speed period." In some embodiments, sequentially first TCP data packet 330 may refer to the data carried in sequentially first TCP data packet 330.

Figure 4:
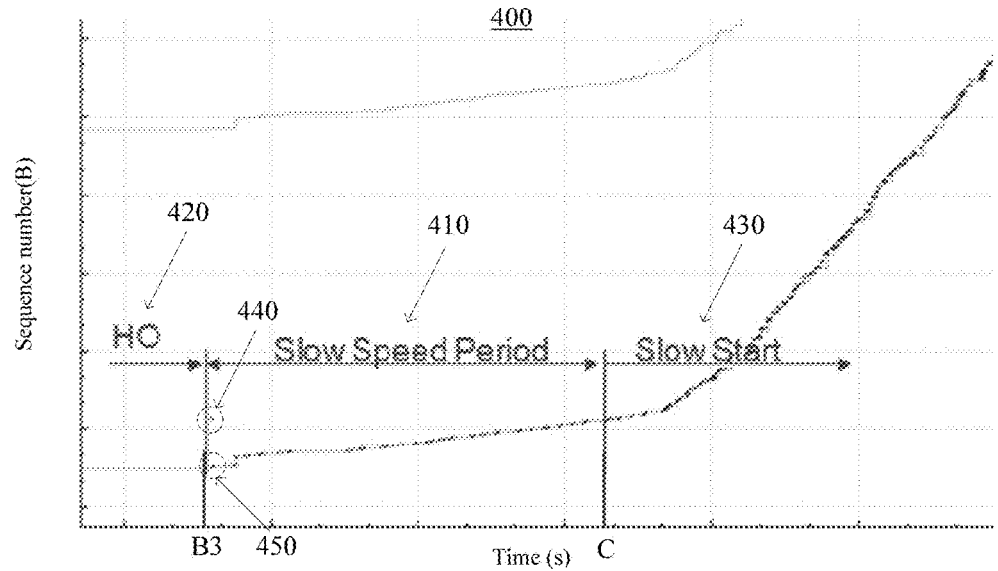
FIG. 4 illustrates a diagram 400 according to an example of the disclosure.

FIG. 4 illustrates a diagram 400 according to an example of the disclosure. Diagram 400 may illustrate the real reception of TCP segments associated with the cross technology handover of the mobile device in an example. The reception of TCP segments before the handover is not shown in FIG. 4 because the reception is substantially the same as the expected reception of TCP segments before the handover in FIG. 2. However, the reception of the TCP segments after the handover in FIG. 4 is different from the expected reception of the TCP segments after the handover in FIG. 2. As illustrated in FIG. 4, "slow speed period" 410 exists between wireless cross technology handover (HO) 420 and the "slow-start" process 430.

Due to the combination of the nature of the different data transmission layer, the wireless stack architectures, and the internet routine and timings, some high sequence number TCP data packets, such as TCP data packet 440 in FIG. 4, sent before the wireless cross technology handover, such as wireless cross technology handover 420 in FIG. 4, may survive the data loss caused by the wireless cross technology handover and may arrive at the mobile device prior to some low sequence number TCP data packets, such as TCP data packet 450 in FIG. 4, after the handover. In some embodiments, TCP data packet 440 may refer to the data carried in TCP data packet 440 and TCP data packet 450 may refer to the data carried in TCP data packet 450. In some embodiments, the lowest sequence number carried in a high sequence number TCP data packet is higher than the highest sequence number carried in a low sequence number TCP data packet.

In some real cross technology handover situations, the sequentially first TCP segment, such as TCP data packet 440 in FIG. 4 received by the remote TCP server after the handover, may have a sequence number larger or higher than, and discrete to the continuous cumulative sequence number of the last TCP data packet received by the remote TCP server before the cross technology handover (not shown in FIG. 4). In an example, the sequence number of the sequentially first TCP data packet received after the handover starts from N+M, where N and M are numbers, N>0 and M>0 and the sequence number the last TCP continuous cumulative data segment is up to N. In such a scenario, a gap exists in the sequence numbers, where the width of the gap is M.

Since the TCP session supports the SACK option, when the data in the sequentially first received TCP data packet, such as TCP data packet 440 in FIG. 4, after the handover has a gap to the last continuous cumulative received data before the handover, the ACK packet associated with the sequentially first received TCP data packet will have the SACK option indicating that a discrete TCP data packet, such as TCP data packet 440, is received by the mobile device. However, when the data in the first received TCP data packet after the handover is lower than or contingent to the continuous cumulative received data before the handover, the ACK packet associated with first received TCP data packet will not have the SACK option. In some embodiments, the ACK packet may be an acknowledgment (ACK) in Request For Comments (RFC) 793. In some embodiments, the ACK packet may be a duplicate ACK in RFC 2001 or RFC 2581. In some embodiments, an ACK packet with an SACK option refers to an ACK packet with SACK option data. In some embodiments, the SACK option data may refer to valid data stored in SACK option, such as a valid value of the left edge of a block (data block) and a valid value of the right edge of the block (data block) in Request For Comments (RFC) 2018.

When the first ACK packet received by the remote TCP server after the cross technology handover is the ACK packet with the SACK option, the remote TCP server will make the TCP data transmission from the remote TCP server, such as TCP server 107, to the mobile device, such as mobile device 105, to a process associated with "SACK recovery algorithm" according to RFC 6675. The process associated with "SACK recovery algorithm" may cause a "slow speed period", such as "slow speed period" 410 as illustrated in FIG. 4. The "SACK recovery algorithm" is designed for congestion control. In "slow speed period" 410, the TCP congestion window of the remote TCP server, such as TCP server 107, will not increase. Furthermore, as mentioned before, during the handover, the TCP congestion window of the remote TCP server has already been set to minimum due to the RTO. Therefore, the TCP congestion window will be kept in minimum during "slow speed period" 410 in FIG. 4. During "slow speed period" 410 in FIG. 4, the speed of sending TCP data packets is limited by the size of the congestion window kept in minimum. Limited by the congestion window size, the remote TCP server has to wait for the ACKs before sending new TCP data packets. Because the size of the congestion window is very small, the process of TCP data transmission has to spend significant amount of time in waiting for the ACK. Consequently, the speed of the TCP data transmission is slow during the process associated with the "SACK recovery algorithm." The low speed TCP data transmission will continue until the data received by the TCP server in the mobile device reaches the high sequence number data received after the handover. After the data received by the TCP server in the mobile device reaches the high sequence number data received after the handover, the TCP server in the mobile device start to respond the remote TCP server with an ACK without an SACK option. Based on the ACK without the SACK option sent to the remote TCP server, the remote TCP server will exit the "SACK recovery algorithm."

Figure 5:
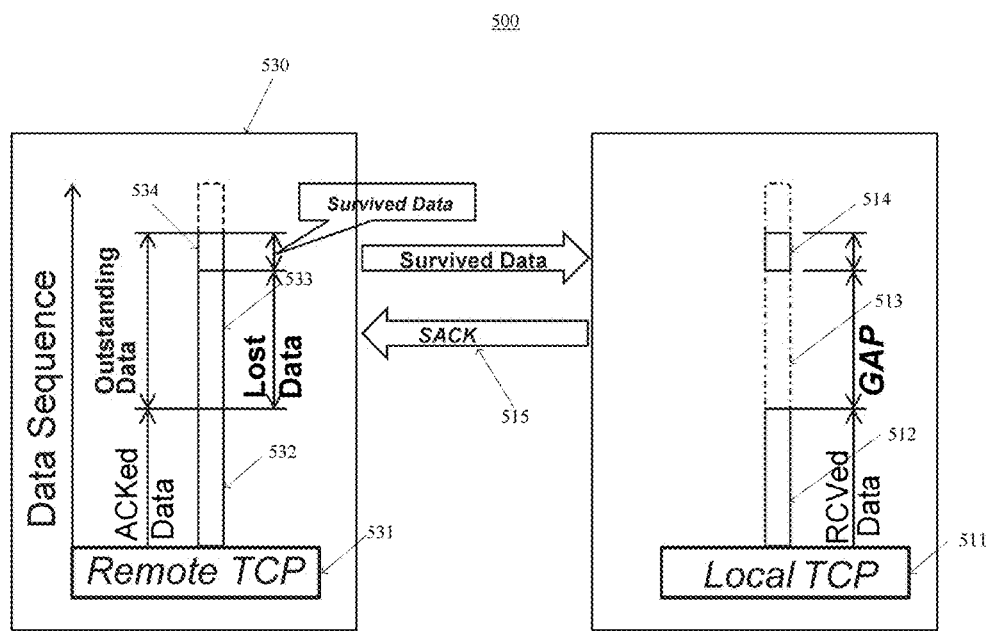
FIG. 5 illustrates a flowchart of a method 500 according to an example of the disclosure.

FIG. 5 illustrates a diagram 500 showing TCP data transmission over a cross technology handover according to an example of the disclosure. In FIG. 5, mobile device 510 may be a smart phone, laptop and pad, such as mobile device 105 in FIG. 1. Local TCP 511 may be implemented based a processor in mobile device 510 and computer-readable instructions and data stored in a memory in mobile device 510. Device 530 may be a network server, laptop, personal computer or mobile phone, such as TCP server 107 in FIG. 1. Device 530 may work as a remote TCP server associated with mobile device 510. Remote TCP 531 may be implemented based a processor in mobile device 530 and computer-readable instructions and data stored in a memory in mobile device 530. Remote TCP 531 may send TCP data packets to Local TCP 511 via a TCP session. Local TCP 511 may send ACK packets in response to the TCP segments via the same TCP session. ACKed Data 532 at Remote TCP 531 represents data that are successfully sent to Local TCP 511. ACKed Data 532 are the data successfully transmitted to Local TCP 511. Lost Data 533 at Remote TCP 531 represents data that are not received by Local TCP 511 because of the cross technology handover of the mobile device. Lost Data 533 at Remote TCP 531 corresponds to Gap 513 at the Local TCP 511. Survived Data 534 at Remote TCP 531 represents data that have sequence numbers higher than Lost Data 533 and arrive at Local TCP 511. After Survived Data 534 received at Local TCP 511 is referred to as received (RCVed) Survived Data 514. Based on the sequence numbers of RCVed Survived Data 514 and the sequence numbers of RCVed Data 512, Local TCP 511 may determine GAP 513 between RCVed Data 512 and Survived Data 534.

Because Survived Data 534 arrives at Local TCP 511 and RCVed Survived Data 514 are discrete from RCVed Data 512, Local TCP 511 sends ACK packets 515 with SACK options to Remote TCP 531. The ACK packets 515 with the SACK options may also be refer to as SACK packets. When Remote TCP 531 receives an ACK packet 515 with the SACK option, Remote TCP 531 starts the process associated with the "SACK recovery algorithm," which causes the "slow speed period" as discussed above, such as "slow speed period" 410 in FIG. 4.

Figure 6:
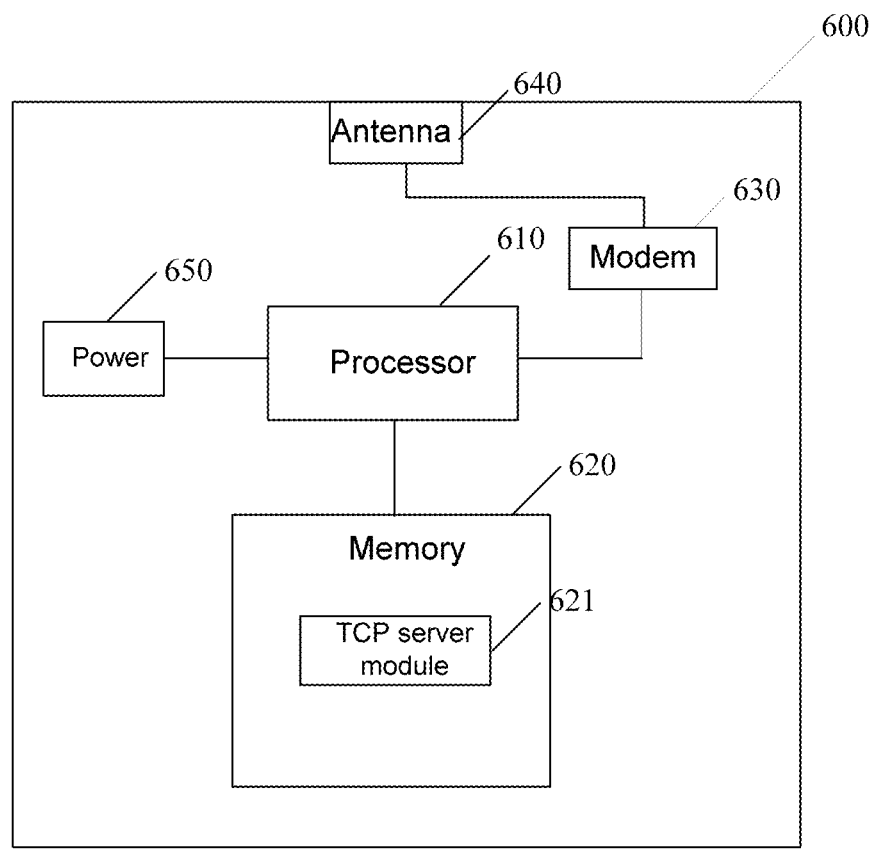
FIG. 6 illustrates a schematic diagram of a mobile device 600 according to an embodiment of the disclosure.

FIG. 6 illustrates a schematic diagram of a mobile device 600 according to an embodiment of the disclosure.

Mobile device 600 may include a processor 610, a memory 620, a modem 630, antenna 640 and a power supply 650. Processor 610 may represent one or more processors. Processor 610 may be implemented as a general processor or may be part of one or more application specific integrated circuits (ASICs) and/or digital signal processors (DSPs). Mobile device 600 may be mobile device 105 in FIG. 1 or mobile device 510 in FIG. 5.

In some embodiments, memory 620 is coupled with processor 610. In some embodiments, memory 620 may be a random access memory (RAM), such as a dynamic RAM (DRAM) or a static RAM (SRAM), or a read only memory (ROM). In some embodiments, memory 620 may be a solid-state drive (SSD) or a hard disk drive (HDD). In some embodiments, memory 620 may both include RAM or ROM and include an SSD or HDD. Processor 610 may perform a plurality of operations according to the instructions included in the software modules. Memory 620 includes a TCP server module 621. TCP server module 621 is a software module including computer-readable instructions and data. In some embodiments, the computer-readable instructions and data may be or include a TCP stack. Based on the computer-readable instructions and data in TCP server module 621, processor 610 may implement the function of a TCP server. For example, processor 610, may directly or indirectly, perform a plurality of operations associated with TCP. The operations may include establishing a TCP session with the remote TCP server, such as TCP server 107 in FIG. 1 or device 530 in FIG. 5, sending or receiving TCP data packets and TCP ACKs to the remote TCP server, determining whether the condition of removing an SACK option from an ACK is met, deleting the SACK option from the ACK, etc. In some embodiments, an ACK packet with an SACK option refers to an ACK packet with SACK option data. In some embodiments, the SACK option data may refer to valid data stored in SACK option, such as a valid value of the left edge of a block (data block) and a valid value of the right edge of the block (data block) in Request For Comments (RFC) 2018. Modem 630 may modulate signals so that modem 630 may send the modulated signals to a base station via antenna 640. Modem 630 may demodulate signals received from the base station via antenna 640 so that mobile device 600 may read the information carried in the received signals. In some embodiments, antenna 640 may be Microstrip Antenna (MSA), Planar Inverted-F Antenna (PIFA) and/or Printed Antenna. Power supply 650 may be used to provide electricity to mobile device 600. In some embodiments, power supply 650 may be a physical circuit to stabilize or modify the voltage of incoming electricity. In some embodiments, power supply 650 may transform alternating current into direct current. In some embodiments, a cross layer communication channel may exist between the TCP server in mobile device 600 and modem 630. Based on the cross layer communication channel, modem 630 may send notifications to the TCP server in mobile device 600. In some embodiments, based on the computer-readable instructions and data in TCP server module 621, processor 610 is configured to detect a cross technology handover associated with the mobile device, receive a sequentially first TCP data packet after the handover via a TCP session between the mobile device and a remote TCP server, generate a first acknowledgement (ACK) associated with the sequentially first TCP data packet, where the first ACK comprises a first Selective ACK (SACK) option, remove the first SACK option from the first ACK when a gap exists between the data in the sequentially first TCP data packet and the data received before the handover, and send the first ACK without the first SACK option to the remote TCP server via the TCP session. The ACK may refer to an ACK packet.

Because the SACK option in the ACK is deleted by the mobile device, such as mobile device 105, when a gap exists between the data in the sequentially first TCP data packet and the data received before the handover, the remote TCP server, such as TCP server 107, will not enter the "slow speed period" as illustrated in FIG. 4. Consequently, the TCP data transmission from the remote TCP server to the mobile device may recover to its full speed faster.

Figure 7:
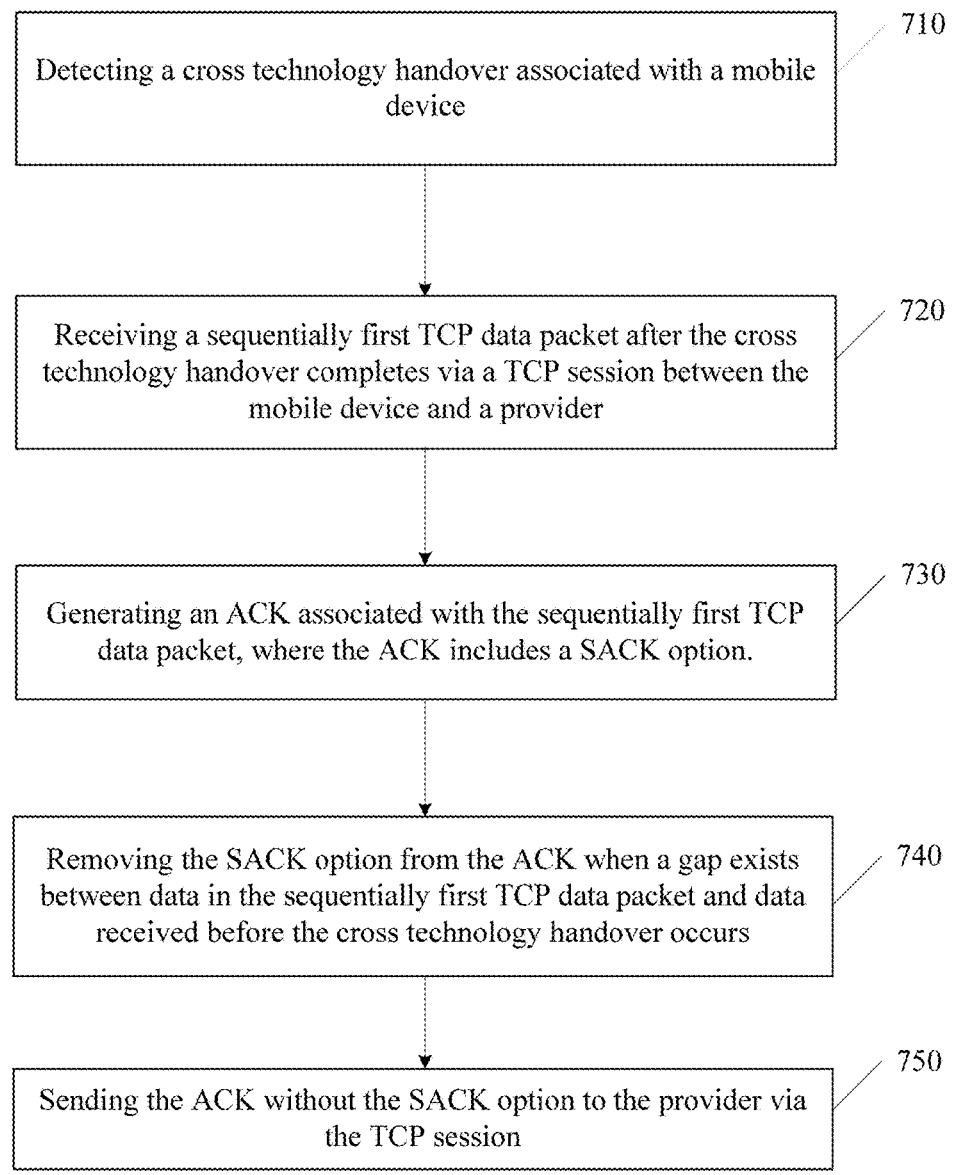
FIG. 7 illustrates a flowchart of a method 700 according to an embodiment of the disclosure.

FIG. 7 illustrates a flowchart of a method 700 according to an embodiment of the disclosure.

At operation 710, a mobile device, such as mobile device 600, mobile device 105 or mobile device 510, detects a cross technology handover associated with the mobile device. The cross technology handover may occur when the mobile device moves from a cell based on the first wireless technology to a second cell based on the second wireless technology, where the first and second wireless technologies are different from each other. The handover may also occur when the modem has the Circuit Switch Fall Back (CSFB) or the CSFB ends. The detection of the cross technology handover may be performed by the modem in the mobile device, such as modem 630 in mobile device 600. After the detection of the cross technology handover, the modem in the mobile device may notifies a TCP server in the mobile device, such as the TCP server in mobile device 600, of the cross technology handover. The TCP server in the mobile device 600 may be referred to as a local TCP server of mobile device 600. The notification may be sent via a cross layer communication channel between the wireless modem and the local TCP server. The TCP server in the mobile device is downloading TCP data from a remote TCP server when the mobile device starts to experience the cross technology handover.

At operation 720, the mobile device receives a sequentially first TCP data packet after the cross technology handover occurs via a TCP session between the mobile device and the remote TCP server. The TCP data packet may represent a TCP segment. In some embodiments, when the cross technology handover occurs, the mobile device doesn't receive any TCP data packet via the TCP session. After the cross technology handover, the mobile device may receive the sequentially first TCP data packet. After receiving the sequentially first TCP data packet, the mobile device may further receive sequentially second and third TCP data packets one by one. The TCP session supports the Selective ACK (SACK) option. It means that any of the TCP server in the mobile device and the remote TCP server, such as TCP server 107, may generate and send an ACK packet with an SACK option to the other server. The other server may recognize the SACK option and correctly read out the contents carried in the SACK option. In some embodiments, an ACK packet with an SACK option refers to an ACK packet with SACK option data. In some embodiments, SACK option data may refer to valid data stored in SACK option. For example, the SACK option data may include a valid value of the left edge of a block (data block) and a valid value of the right edge of the block (data block) in Request For Comments (RFC) 2018.

At operation 730, the mobile device, such as mobile device 105 or 600, generates an ACK packet associated with the sequentially first TCP data packet, where the ACK includes a Selective ACK (SACK) option. In some embodiments, the ACK packet is generated by the TCP server in the mobile device.

At operation 740, the mobile device, such as mobile device 105, 510 or 600, removes the SACK option from the ACK packet when a gap exists between data in the sequentially first TCP data packet and data received before the cross technology handover occurs.

The mobile device may check whether the most right edge in SACK option is larger than the cumulative ACK sequence number received by the mobile device before the cross technology handover. In some embodiments, an SACK option has only one boundary item including a left edge and a right edge. In such scenario, the most right edge is the only right edge. In some embodiments, an SACK option has a plurality of boundary items, each of which includes a left edge and a right edge. In such scenario, the most right edge is the largest among all the right edges.

Figure 12:
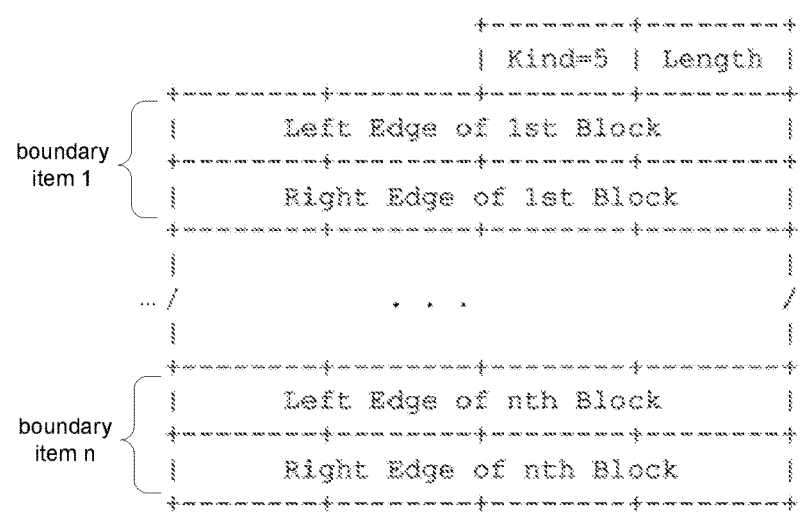
FIG. 12 illustrates a table 1 according to an embodiment of the disclosure.

FIG. 12 illustrates a Table 1 illustrating a plurality of boundary items in an SACK option.

The quantity of the boundary items in Table 1 is n, each boundary item corresponding to a data block. For example, boundary item 1, corresponding to the 1st data block, includes a left edge of the 1st data block and a right edge of the 1st data block. N left edges and n right edges are included in Table 1. The most right edge in Table 1 is the right edge in boundary item n. The most right edge in Table 1 is also the right edge of nth data block. In some embodiments, the SACK option and the contents in the SACK option may be defined by Request For Comments (RFC) 2018 published by Internet Engineering Task Force (IETF).

If the most right edge in SACK option is larger than the cumulative ACK sequence number, a gap exists between the data in the sequentially first TCP data packet and the data received before the handover based on the SACK option. In some embodiments, the cumulative ACK sequence number before the cross technology handover may refer to the largest sequence number received by the mobile device before the cross technology handover.

When the gap exists between the data in the sequentially first TCP data packet and the data received before the handover based on the SACK option, the mobile device may remove the SACK option from the ACK packet to be sent to the remote TCP server. Because no SACK option is in the ACK packet, the remote TCP server will not enter the "slow speed period" as illustrated in FIG. 4. Therefore, the TCP data transmission based on the TCP session will recover to its full speed faster than a recovery including the "slow speed period".

In some embodiments, when the gap doesn't exist, the mobile device may send an ACK packet with the SACK option.

At operation 750, the mobile device, such as mobile device 105, 510 or 600, sends the ACK packet without the SACK option to the remote TCP server, such as TCP server 107 or device 530, via the TCP session. Because the ACK packet is without the SACK option, the remote TCP server will enter the "slow-start" process, rather than "slow speed period." Therefore, the TCP data transmission will recover rapidly.

In some embodiments, operations 720-750 are performed or partially performed by TCP server in the mobile device, such as the TCP server in mobile device 600 or the TCP server in mobile device 105.

In some embodiments, with respect to the sequentially second TCP data packet, the mobile device may generate another ACK packet with another SACK option. With respect to the sequentially third TCP data packet, the mobile device may generate one more ACK packet with one more SACK option. Based on the SACK option associated with the sequentially second TCP data packet, the mobile device, such as mobile device 105, 510 or 600, determines whether a gap exists between the data in the sequentially first TCP data packet and the data received before the handover. If the gap exists, the mobile node removes the SACK option from the ACK packet associated with the sequentially second TCP data packet and sends the ACK packet without the SACK option to the remote TCP server, such as TCP server 107 or device 530. If the gap doesn't exist, the mobile mode may send the ACK packet, having the SACK option, associated with the sequentially second TCP data packet. Therefore, even if the ACK packet sent at operation 750 doesn't successfully received by the remote TCP server, the ACK packet associated with the sequentially second TCP data packet may make the remote TCP server to enter the "slow-start" process.

It is possible that the first ACK packet gets lost during the transmission from the mobile device to the remote TCP server via the TCP session. The mobile device may make the second ACK packet to be without the SACK option. Even if the first ACK packet doesn't arrive at the remote TCP server, the second ACK packet may make the remote TCP server to receive an ACK packet without the SACK option. Therefore, the remote TCP server still may avoid entering the "slow speed period."

Figure 8:
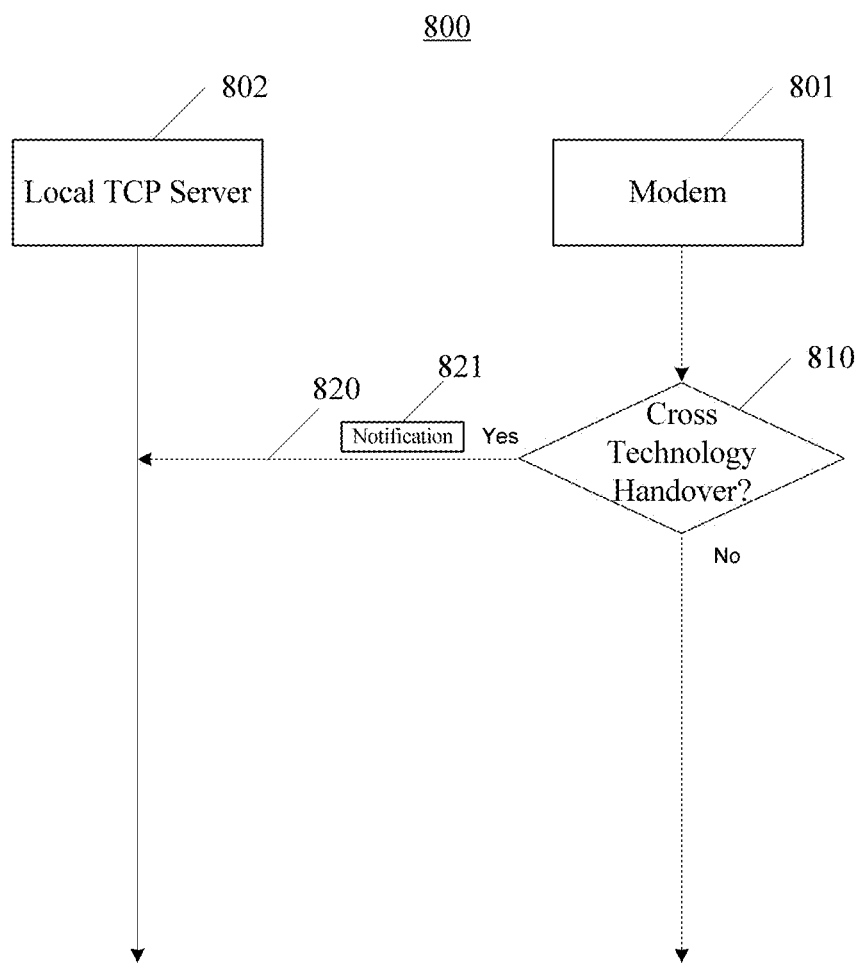
FIG. 8 illustrates a flowchart of a method 800 according to an embodiment of the disclosure.

FIG. 8 illustrates a flowchart of a method 800 according to an embodiment of the disclosure. Method 800 may include operations performed by modem 801 in a mobile device, and local TCP server 802 in the mobile device. In some embodiments, the mobile device may be mobile device 600, modem 801 may be modem 630 in mobile device 600, and local TCP server 802 may be a TCP server in mobile device 600, where the TCP server in mobile device 600 may be implemented based on processor 610 and TCP server module 621.

At operation 810, modem 801 in the mobile device checks whether the mobile device is experiencing a cross technology handover. If the mobile device is experiencing the cross technology handover, the method 800 proceeds to operation 820.

At operation 820, modem sends notification 821 to local TCP server 802 in the mobile device, such as the TCP server in mobile device 600. Notification 821 may be used to inform local TCP server 802 that the mobile device is experiencing a cross technology handover. In some embodiments, notification 821 may be used to inform local TCP server 802 that the mobile device just completed a cross technology handover. In some embodiments, notification 821 is transmitted via a cross layer communication channel between local TCP server 802 and modem 801.

Figure 9:
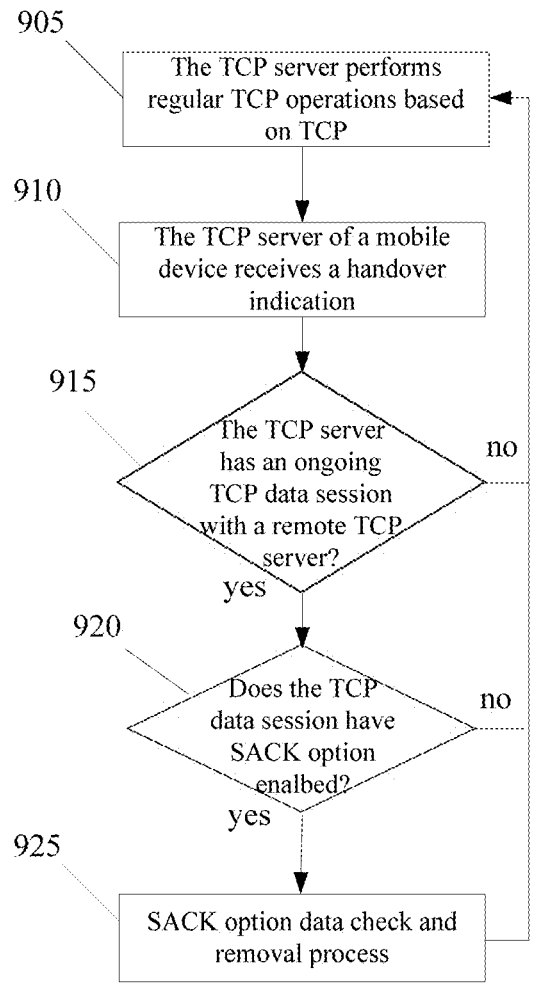
FIG. 9 illustrates a flowchart of a method 900 according to an embodiment of the disclosure.

FIG. 9 illustrates a flowchart of a method 900 according to an embodiment of the disclosure. Method 900 may include operations performed by a local TCP server of a mobile device, such as the TCP server in mobile device 600, after the reception of an handover indication.

At operation 905, the TCP server of the mobile device, such as the TCP server in mobile device 600, performs regular TCP operations based on TCP. In some embodiments, the regular TCP operations may include a plurality of TCP operations based on or included in TCP standards, such as RFC 793, RFC 1180, RFC 1122 and RFC 2018.

At operation 910, the TCP server of the mobile device receives a handover indication. The handover indication may be sent by the modem in the mobile device, such as modem 630 or modem 801. The handover indication indicates that the mobile device experience a cross technology handover At operation 915, the TCP server checks whether the TCP server has an ongoing TCP data session for data transmission with a remote TCP server, such as TCP server 107 in FIG. 1 or device 530 in FIG. 5. If the ongoing TCP data session exists, method 900 proceeds to 920. If the ongoing TCP data session doesn't exist, method 900 proceeds back to operation 905.

At operation 920, the TCP server checks whether the ongoing TCP data session has SACK option enabled (supported). If the SACK option is enabled in the TCP data session, the TCP server may insert SACK option data into an ACK packet from the TCP server in the mobile device to the remote TCP server. When the remote TCP server receives the ACK packet, the remote TCP server may recognize the SACK option data. If the SACK option is enabled in the TCP session, method 900 proceeds to operation 925. If the SACK option is not enabled in the TCP data session, method 900 proceeds back to operation 905.

Figure 10:
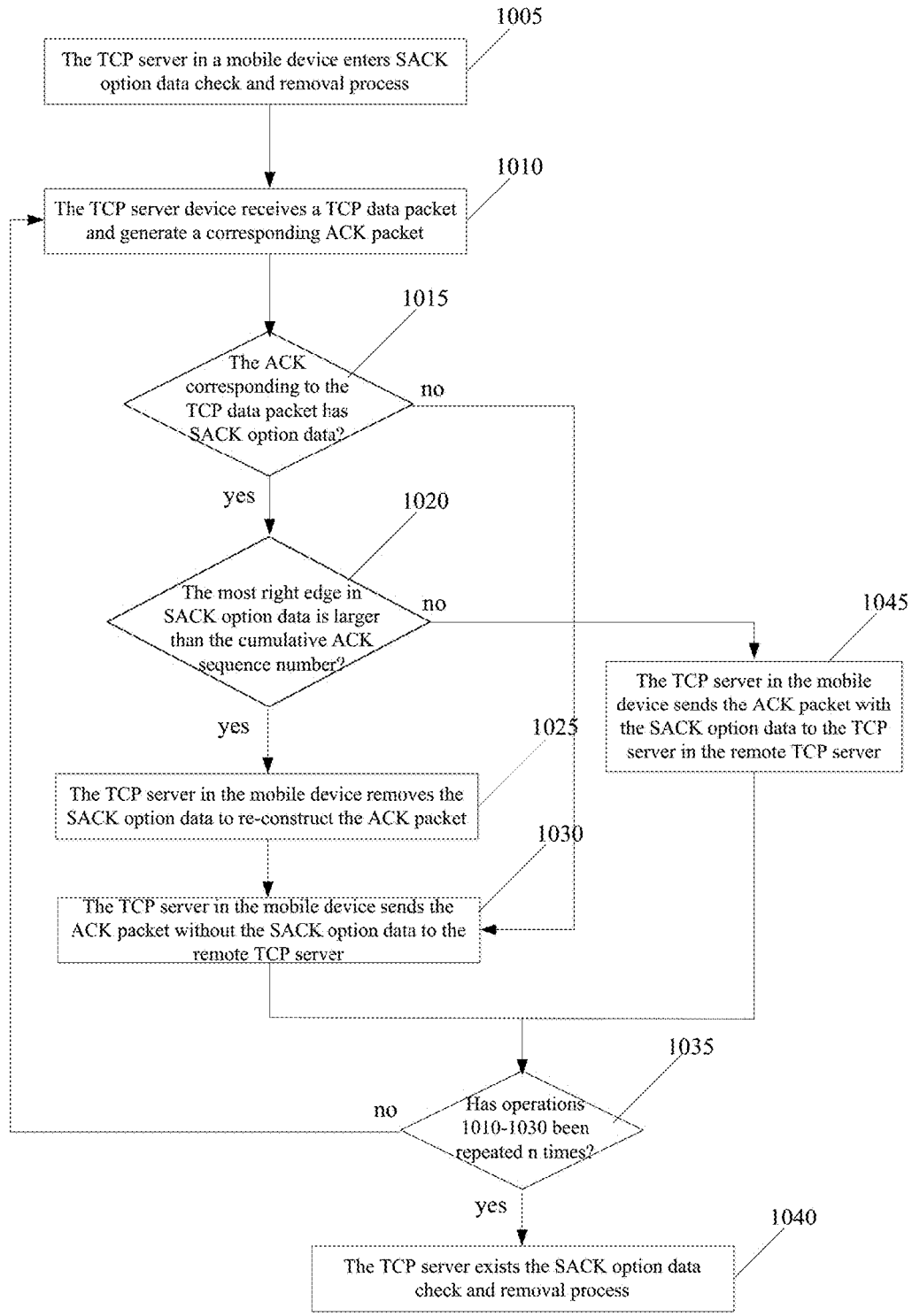
FIG. 10 illustrates a flowchart of a method 1000 according to an embodiment of the disclosure.

At operation 925, the TCP server in the mobile device enters SACK option data check and removal process. The details of the check and removal process are introduced in the method 1000 as illustrated by FIG. 10. In some embodiments, the SACK option data may refer to valid data stored in SACK option of an ACK packet, such as a valid value of the left edge of a block (data block) and a valid value of the right edge of the block (data block) in RFC 2018.

FIG. 10 illustrates a flowchart of a method 1000 according to an embodiment of the disclosure. In some embodiments, the method 1000 may include the details of operation 925 in FIG. 9.

At operation 1005, the TCP server in the mobile device, such as the TCP server in mobile device 600, enters the SACK option data check and removal process.

At operation 1010, the TCP server in the mobile device, such as the TCP server in mobile device 600, receives a TCP data packet, i.e. a TCP segment, from the remote TCP server, such as TCP server 107 or device 530. In some embodiments, the received TCP data packet is the sequentially first TCP data packet received via the TCP session between the TCP server in the mobile device and the remote TCP server after the cross technology handover. At operation 1010, the TCP server may further generate an ACK packet corresponding to the TCP data packet.

At operation 1015, the TCP server in the mobile device checks whether the ACK packet corresponding to the TCP data packet has SACK option data. If the ACK packet corresponding to the TCP data packet has the SACK option data, method 1000 proceeds to operation 1020. If the ACK packet doesn't have the SACK option data, method 1000 proceeds to operation 1030. In some embodiments, the SACK option data may refer to valid data stored in SACK option of an ACK packet, such as a valid value of the left edge of a block (data block) and a valid value of the right edge of the block (data block) in Request For Comments (RFC) 2018.

At operation 1020, the TCP server in the mobile device checks whether the most right edge in SACK option data is larger than the cumulative ACK sequence number. In some embodiments, an SACK option data has only one edge item including a left edge and a right edge. In such scenario, the most right edge is the only right edge. In some embodiments, an SACK option data has a plurality of boundary items, each of which includes a left edge and a right edge. In such scenario, the most right edge is the largest one among all the right edges.

If the most right edge in the SACK option data is larger than the cumulative ACK sequence number, it indicates that a gap exists between the TCP data packet received at operation 1010 and TCP data packets before the cross technology handover. Therefore, method 1000 proceeds to operation 1025. In some embodiments, the most right edge in the SACK option data is larger than the cumulative ACK sequence number before the handover may mean that the most right edge in the SACK option data is larger than the largest sequence number received by the handover.

If the most right edge in the SACK option data is not larger than the cumulative ACK sequence number, the mobile device cannot determine that a gap exists between the TCP data packet received at operation 1010 and the TCP data packets received before the handover. Therefore, method 1000 proceeds to operation 1045.

At operation 1025, the TCP server in the mobile device removes the SACK option data to re-construct the ACK packet. Therefore, the ACK packet changes from an ACK packet with SACK option data into a re-constructed ACK packet without an SACK option data. The re-constructed ACK packet without an SACK option data may represent an ACK packet with an empty SACK option or with an SACK option having no valid data. In some embodiments, removing the SACK option data may refer to removing the SACK option.

At operation 1030, the TCP server in the mobile device sends the ACK packet without the SACK option data to the remote TCP server. Because the ACK packet has no SACK option, the remote TCP server will not enter the "slow speed period" as illustrated in FIG. 4 so that the TCP data transmission from the remote TCP server to the mobile device may recover to full speed rapidly.

At operation 1035 the TCP server in the mobile device determine whether operations 1010-1030 have been repeated n times, where n is a number and n>0. For example, n may be 1, 2, 3, 4 or 5. If operations 1010-1030 have been repeated n times, method 1000 may proceed to operation 1040. If operations 1010-1030 have not been repeated n times, method 100 may proceed back to operation 1010. Repeating operations 1010-1030 may reduce the possibility of losing the ACK packet sent to the remote TCP server via the TCP session.

At operation 1040, the TCP server exits method 1000, the SACK option data check and removal process.

At operation 1045, the TCP server in the mobile device sends the ACK with the SACK option data to the remote TCP server. After operation 1405, method 1000 proceeds to operation 1035.

Figure 11:
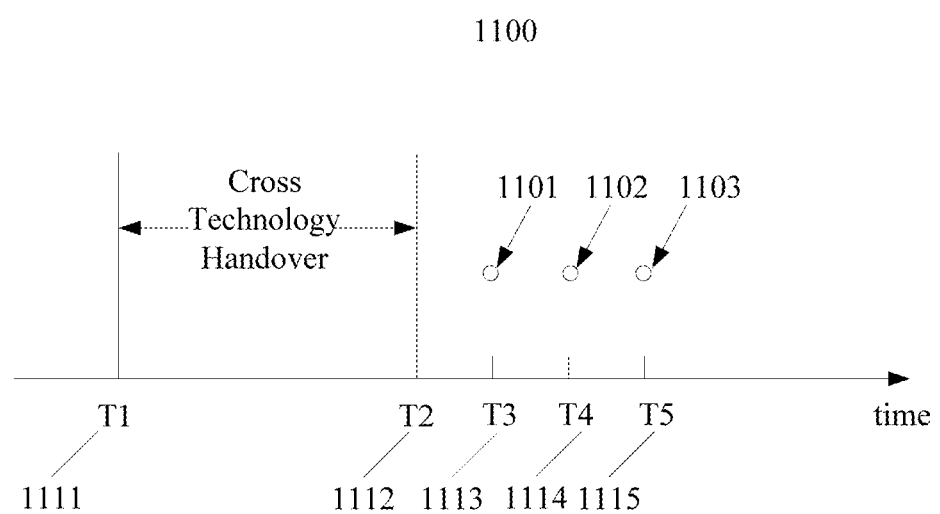
FIG. 11 illustrates a diagraph 1100 according to an embodiment of the disclosure.

FIG. 11 illustrates a diagraph showing the reception of TCP data packets according to an embodiment of the disclosure.

A cross technology handover experienced by a mobile device, such as mobile device 105, 510 or 600, starts at time instance T1 1111 and ends at time instance T2 1112. At time instance T3 1113, the mobile device receives the sequentially first TCP data packet 1101 via a TCP session. At time instance T4 1113, the mobile device receives the sequentially second TCP data packet 1102 via the TCP session. At time instance T5 1114, the mobile device receives the sequentially third TCP data packet 1103. No TCP data packet between T2 1112 and T3 1113 via the TCP session. Furthermore, no TCP data packet is received between T3 1113 and T4 1114 via the TCP session. Moreover, no TCP data packet is received between T4 1114 and T5 1115 via the TCP session.

While several embodiments have been provided in the present disclosure, it should be understood that the disclosed methods and devices might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, comprising:
    detecting, by a mobile device, a handover for the mobile device;
    receiving, by the mobile device via a Transmission Control Protocol (TCP) session between the mobile device and a remote TCP server, a sequentially first TCP data packet after the handover;
    generating, by the mobile device, a first acknowledgement (ACK) associated with the sequentially first TCP data packet, wherein the first ACK comprises a first Selective ACK (SACK) option that causes the remote TCP server to enter a slow speed period that exists between the handover and a slow-start process, a TCP congestion window is set in minimum during the slow speed period, and a speed of sending TCP data packets is limited by the TCP congestion window that is kept in minimum;
    determining, by the mobile device, a gap between data in the sequentially first TCP data packet and data received before the handover, wherein the gap is determined when a most right edge in the first SACK option is larger than a cumulative ACK sequence number of the first ACK;
    removing, by the mobile device in response to the gap between the data in the sequentially first TCP data packet and the data received before the handover, the first SACK option from the first ACK; and
    sending, by the mobile device, the first ACK in which the first SACK option is removed to the remote TCP server via the TCP session, wherein the first SACK option has one or more boundary items, each including a left edge and a right edge.

2. The method of claim 1, wherein when the SACK option includes a plurality of right edges, the most right edge is the largest one among the plurality of right edges.

3. The method of claim 1, wherein when the first SACK option includes only one right edge, the most right edge is the right edge.

4. The method claim 1, further comprising:
receiving, by the mobile device via the TCP session, a sequentially second TCP data packet after the handover;
generating, by the mobile device, a second ACK associated with the sequentially second TCP data packet, wherein the second ACK comprises a second SACK option;
removing, by the mobile device, the second SACK option from the second ACK; and
sending, by the mobile device, the second ACK in which the second SACK option is removed to the remote TCP server via the TCP session.

5. The method of claim 4, wherein the second SACK option is removed from the second ACK when the most right edge in the second SACK option is larger than cumulative ACK sequence number of the first ACK.

6. The method of claim 1, wherein the first SACK option is an non-empty SACK option or is an effective SACK option.

7. The method of claim 1, wherein the handover for the mobile device is either a cross area handover that occurs when the mobile device crosses from a first area to a second area, or a cross technology handover that occurs when the mobile device crosses from a first technology to a second technology.

8. A mobile device, comprising:
a non-transitory memory comprising instructions; and
one or more processors in communications with the memory, wherein the one or more processors are configured to execute the instructions to:
detect a handover for the mobile device;
receive, via a Transmission Control Protocol (TCP) session between the mobile device and a remote TCP server, a sequentially first TCP data packet after the handover;
generate a first acknowledgement (ACK) associated with the sequentially first TCP data packet, wherein the first ACK comprises a first Selective ACK (SACK) option that causes the remote TCP server to enter a slow speed period that exists between the handover and a slow-start process, a TCP congestion window is set in minimum during the slow speed period, and a speed of sending TCP data packets is limited by the TCP congestion window that is kept in minimum;
determine a gap between data in the sequentially first TCP data packet and data received before the handover, wherein the gap is determined when a most right edge in the first SACK option is larger than a cumulative ACK sequence number of the first ACK;
remove, in response to the gap between the data in the sequentially first TCP data packet and the data received before the handover, the first SACK option from the first ACK; and
send the first ACK in which the first SACK option is removed to the remote TCP server via the TCP session, wherein the first SACK option has one or more boundary items, each including a left edge and a right edge.

9. The mobile device of claim 8, wherein when the first SACK option includes a plurality of right edges, the most right edge is the largest one among the plurality of right edges.

10. The mobile device of claim 8, wherein when the first SACK option includes only one right edge, the most right edge is the right edge.

11. The mobile device claim 8, wherein the processors are further configured to execute the instructions to:
receive, via the TCP session, a sequentially second TCP data packet after the handover;
generate a second ACK associated with the sequentially second TCP data packet, wherein the second ACK comprises a second SACK option;
remove the second SACK option from the second ACK; and
send the second ACK in which the second SACK option is removed to the remote TCP server via the TCP session.

12. The mobile device of claim 11, wherein the second SACK option is removed from the second ACK when the most right edge in the second SACK option is larger than cumulative ACK sequence number of the first ACK.

13. The mobile device of claim 8, wherein the first SACK option is a non-empty SACK option or is an effective SACK option.

14. The mobile device of claim 8, wherein the handover for the mobile device is either a cross area handover that occurs when the mobile device crosses from a first area to a second area, or a cross technology handover that occurs when the mobile device crosses from a first technology to a second technology.

15. A computer program product comprising computing executable instructions stored on a non-transitory medium that when executed by a processor cause the processor to:
detect a handover for a mobile device;
receive, via a Transmission Control Protocol (TCP) session between the mobile device and a remote TCP server, a sequentially first TCP data packet after the handover;
generate a first acknowledgement (ACK) associated with the sequentially first TCP data packet, wherein the first ACK comprises a first Selective ACK (SACK) option that causes the remote TCP server to enter a slow speed period, that exists between the handover and a slow-start process, a TCP congestion window is set in minimum during the slow speed period, and a speed of sending TCP data packets is limited by the TCP congestion window that is kept in minimum;
determine a gap between data in the sequentially first TCP data packet and data received before the handover, wherein the gap is determined when a most right edge in the first SACK option is larger than a cumulative ACK sequence number of the first ACK;
remove in response to the gap between the data in the sequentially first TCP data packet and the data received before the handover, the first SACK option from the first ACK; and
send the first ACK in which the first SACK option is removed from the mobile device to the remote TCP server via the TCP session, wherein the first SACK option has one or more boundary items, each including a left edge and a right edge.

16. The computer program product of claim 15, wherein when the first SACK option includes a plurality of right edges, the most right edge is the largest one among the plurality of right edges.

17. The computer program product of claim 15, wherein the handover for the mobile device is either a cross area handover that occurs when the mobile device crosses from a first area to a second area, or a cross technology handover that occurs when the mobile device crosses from a first technology to a second technology.

\* \* \* \* \*